United States Patent
Berger et al.

(10) Patent No.: US 8,389,448 B1
(45) Date of Patent: Mar. 5, 2013

(54) ANIONIC ETHER AMINES AND PROCESS FOR USING SAME

(75) Inventors: Paul Daniel Berger, Sugar Land, TX (US); Christie Huimin Berger, Sugar Land, TX (US)

(73) Assignee: Oil Chem Technologies, Inc., Sugar Land, TX (US)

( * ) Notice: Subject to any disclaimer, the term of this patent is extended or adjusted under 35 U.S.C. 154(b) by 0 days.

(21) Appl. No.: 13/507,908

(22) Filed: Aug. 6, 2012

Related U.S. Application Data

(62) Division of application No. 13/506,458, filed on Apr. 20, 2012.

(60) Provisional application No. 61/685,317, filed on Mar. 15, 2012.

(51) Int. Cl.
*C09K 8/584* (2006.01)

(52) U.S. Cl. ...................... 507/246; 166/305.1
(58) Field of Classification Search .................. 507/246; 166/305.1
See application file for complete search history.

(56) References Cited

U.S. PATENT DOCUMENTS

| | | | | |
|---|---|---|---|---|
| 4,138,345 A | * | 2/1979 | Williams | 507/246 |
| 4,238,350 A | * | 12/1980 | Larsen et al. | 252/392 |
| 4,492,590 A | * | 1/1985 | Schick et al. | 44/281 |
| 4,846,947 A | * | 7/1989 | Sotoya et al. | 204/530 |
| 5,211,882 A | * | 5/1993 | Tagata et al. | 510/351 |

* cited by examiner

*Primary Examiner* — Alicia Toscano

(57) ABSTRACT

The process for making amphoteric surfactants derived from ether amine s is described. The ether amines may be derived from natural products such as animal, marine or vegetable oils or from petroleum derived raw materials. The application of these amphoteric surfactants to the recovery of residual oil by Enhanced Oil Recovery methods is disclosed.

7 Claims, No Drawings

ANIONIC ETHER AMINES AND PROCESS FOR USING SAME

CROSS REFERENCE TO RELATED APPLICATIONS

This application claims the benefit of provisional application 61/685,317 filed on Mar. 15, 2012. This application is also a Divisional Application of Ser. No. 13/506,458 filed Apr. 20, 2012.

STATEMENT REGARDING FEDERALLY SPONSORED RESEARCH OR DEVELOPMENT

Not Applicable

DESCRIPTION OF ATTACHED APPENDIX

Not Applicable

DESCRIPTION OF FIGURES

NONE

BRIEF DESCRIPTION OF INVENTION

This Invention discloses a process for making anionic ether amine derivatives the reaction of ether amines with 3-chloro 2-hydroxypropyl sulfonic acid sodium salt (CHPSAS) or monosodium chloroacetate (MSCA). The ether amines may be derived from natural products such as animal, marine or vegetable oils or from petroleum derived raw materials.

The invention provides the following advantages:
a) manufactured without the use of a costly and environmental problematic sulfonation processes that use sulfur trioxide, oleum or chlorosulfonic acids,
b) the ether amine sulfonates or carboxylates of the present invention can be used under harsh environmental conditions since it is resistant to high temperature decomposition, and compatible with high electrolyte concentrations,
c) the bulky, branched structure of the ether amine sulfonate or carboxylate of the present invention reduces the adsorption of the surfactant onto a substrate. This is of extreme importance in the case of Enhanced Oil Recovery (EOR) applications.
d) the product can be made using petroleum based raw materials or using plant based, naturally derived, renewable resources as raw material, including but not limited to palm oil, rapeseed oil, canola oil, jatropha oil, crambe oil, sunflower seed oil, to insure a steady supply of environmentally safe, green surfactant,
e) provides low interfacial tension (IFT) for a wide range of the oil and brine. Other advantages to the present invention will become apparent through the description and examples that follow.

DETAILED DESCRIPTION OF THE INVENTION

The reaction of the present invention uses ether amines as one of the starting materials with the structure shown below:

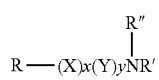

where
R=C1-C30 alkane, or C1-C30 alkenyl, or C4-C18 alkylphenol or C4-C18 dialkylphenol,
R'=H, C1-C30 Alkane, C1-C30 Alkenyl, or R—(X)x(Y)y,
R"=H, C1-C30 Alkane or C1-C30 Alkenyl,
At least one of R' or R"=H,
X=methyloxirane,
Y=oxirane,
X and Y can be present in either order, or be a mixture of the two
x+y=1 to 100.

Ether amines are available from several manufacturers including Huntsman Chemical under the trade name Jeffamine™. CHPSAS is produced by the reaction of epichlorohydrin with sodium bisulfite as is well documented in the literature. MSCA can be obtained as a commercial product or it can be generated from chlorosulfonic acid and alkali as is well known in the literature.

The ether amines are reacted with CHPAS or MSCA at 50-150° C. and optionally in the presence of water and/or other mutual solvents. Mutual solvents include but are not limited to: water, ethylene glycol monobutyl ether, C1-C8 alkoxylated alcohol, glycerin, ethylene glycol and propylene glycol. The reaction generally takes from 2 to 12 hours for completion depending on the composition of the R, R' and R" groups as well as the amount of oxirane and/or methyloxirane present in the starting ether amine, and the reaction temperature.

The proposed structure of the final ether amine derivative of the present invention is shown below:

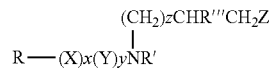

[Figure 2 Structure of the Anionic Ether Amine of the Present Invention]
where;
R=C1-C30 alkane, C1-C30 alkenyl, C4-C18 alkylphenol, or C4-C18 Dialkylphenol;
R'=H, C1-C30 Alkane, C1-C30 Alkenyl or, R—(X)x(Y)y;
R'''=H or OH;
X=methyloxirane;
Y=oxirane;
X and Y can be present in either order, or be a mixture of the two;
X+y=1 to 100;
z=0 or 1;
Z=$SO_3M$ or COOM;
M=H, Na, K, NH4.

The reaction of a mono ether amine with CHPSAS of the present invention is shown below. MSCA may be substituted for CHPSA to give the corresponding carboxylate.

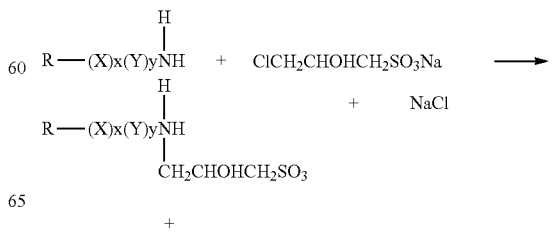

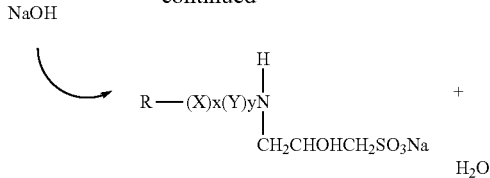

R=C, C1-C30 alkane, C1-C30 alkenyl, C4-C18 alkylphenol, or C4-C18 Dialkylphenol;
X=methyloxirane;
Y=oxirane;
X and Y can be present in either order, or be a mixture of the two;
x+y=1 to 100.

The reaction of a diether amine with CHPSAS of the present invention is shown below. The reaction can also be carried out using MSCA instead of CHPSAS to give the corresponding carboxylate:

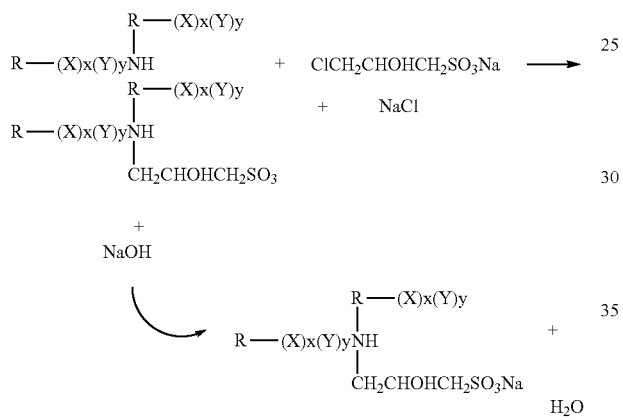

where:
R=C1-C30 alkane, C1-C30 alkenyl, C4-C18 alkylphenol, or C4-C18 Dialkylphenol;
X=methyloxirane;
Y=oxirane;
X and Y can be present in either order, or be a mixture of the two;
x+y=1 to 100, The ether amine derivatives of the present invention provide excellent solubilities in aqueous solutions containing mono and divalent cations. They also provide low surface tension and interfacial tension between the aqueous and hydrocarbon phases. They provide low adsorption onto the reservoir rock surfaces. They are stable at elevated temperatures and in acidic, neutral and alkaline solutions. They can be used in various applications including but not limited to oil field, Enhanced Oil Recovery, detergents, mining, industrial cleaning, coatings, paper, and lubricants.

Example 1

99.0 g (0.200 Moles) of an ether amine where R is C12-14 alkane, y=8, x=0, R' and R" are both H is added to a 250 ml three-necked round-bottom flask fitted with a stirrer, a reflux condenser and a thermocouple to control the temperature of a heating mantle on which the flask rests. To this is added 50.0 g of ethylene glycol monobutyl ether (mutual solvent), 50.0 g water, 41.2 g (0.210 Moles) CHPSAS. The contents are stirred and allowed to react at 80° C. and the progress of the reaction is monitored by measuring the sodium chloride formed through the reaction. After the chloride value has leveled off and is approaching t the completion of the reaction, 10.0 g 50% sodium hydroxide is added to neutralize the product to pH 7-10.

Table 1 shows the progress of the reaction as followed by me/g chloride formed. The theoretical amount of chloride formed if the reaction were complete is 0.799 me/g.

TABLE 1

Progress of Ether Amine Reaction

| Elapsed time, hr | Chloride, me/g | % completion |
|---|---|---|
| 1 | 0.53 | 66 |
| 2 | 0.63 | 79 |
| 3* | 0.64 | 79 |
| 4 | 0.71 | 89 |
| 5 | 0.74 | 93 |
| 6 | 0.79 | 99 |

*NaOH added after 3 hours reaction time at 80° C.

Example 2

Evaluation of Sample from Example 1 Above as an EOR Surfactant to Reduce the Interfacial Tension This example described the IFT results obtained for a crude oil and a solution of the composition of the present invention in seawater. It is well known by those familiar with the art that a low interfacial tension reaching less than 0.02 mN/m is preferred to mobilize the oil from the microscopic capillaries in the reservoir rock where it is trapped. A synthetic sea water sample was prepared according to the formulation shown in Table 2.

TABLE 2

Synthetic Seawater Composition

| Ingredient | % by wt |
|---|---|
| NaCl | 2.75 |
| $MgCl_2 \cdot 6H_2O$ | 0.65 |
| $CaCl_2 \cdot 2H_2O$ | 0.54 |
| Water | 96.06 |

A sample of 0.1 wt % and, 0.2 wt % solutions of the formulation from Example 1 were prepared in the synthetic seawater described in Table 2. The interfacial tension of the surfactant solutions against a Southeast Asian crude oil with API gravity of 28.4 was measured at 90° C. and the results are shown in Table 3 below.

TABLE 3

IFT and Stability of the Ether Amine Sulfonate

| Surfactant conc., wt % | IFT, mN/m, @ 90° C. Initial | IFT, mN/m @ 90° C. Aging @ 90° C. for 4 Weeks |
|---|---|---|
| 0.10 | 0.0047 | 0.0051 |
| 0.20 | 0.0052 | 0.0064 |

The results show that the compositions of the present invention provide ultra-low IFT and they are stable at high temperature. They are suitable as surfactants for Chemical Enhanced Recovery. The compositions of the Invention may be combined with one or more various additives known to the art including but not limited to co-surfactants, co-solvents, brines, alkalis, viscosifying agents, buffers, chelating agents and brine. They are then injected into a subterranean reservoir containing residual hydrocarbons to improve the recovery of these hydrocarbons. The aqueous solution containing the surfactant of the present invention is injected into one or more injection wells and the oil is recovered from one or more production wells. The injection wells(s) and the production well(s) may be the same or they may be different wells.

Further embodiments and alternative embodiments of various aspects of the present invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiment. Elements and materials may be substituted for those illustrated and described herein, parts and processes may be reversed, and certain features of the invention may be utilized independently, as would be apparent to those skilled in the art after having benefited by this description of the invention. Changes may be made in the elements described herein without departing from the spirit and scope of the invention as described in the flowing claims. In addition, it is to be understood that features described herein independently may, in certain embodiments, be combined.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed:

1. A process of recovering crude oil from a subterranean hydrocarbon containing formation which comprises
    (a) injecting into said formation an aqueous solution where one or more anionic ether amines with the structure described below,

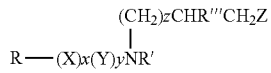

where;
R=C1-C30 alkane, C1-C30 alkenyl, C4-C18 alkylphenol, or C4-C18 Dialkylphenol;
R'=H, C1-C30 Alkane, C1-C30 Alkenyl or, R—(X)x(Y)y;
R'''=H or OH;
X=methyl oxirane;
Y=oxirane;
X and Y can be present in either order, or be a mixture of the two;
x+y=1 to 100;
z=0 or 1;
Z=$SO_3M$ or COOM; and
M=H, Na, K, $NH_4$;
    b) displacing said solution into one or more injection wells and recovering the oil from one or more production wells.

2. The process of recovering crude oil from subterranean hydrocarbon containing formation as described in claim 1 where the aqueous injection fluid may contain one or more cosurfactants selected from the group: anionic surfactants, nonionic surfactants, cationic surfactants, amphoteric surfactants.

3. The process of recovering crude oil from a subterranean hydrocarbon containing formation as described in claim 1 where the aqueous injection fluid may contain one or more viscosifying agents.

4. The process of recovering crude oil from a subterranean hydrocarbon containing formation as described in claim 1 where the aqueous injection fluid may contain one or more co-solvents.

5. The process of recovering crude oil from a subterranean hydrocarbon containing formation as described in claim 1 where the aqueous injection fluid may contain one or more alkalis.

6. The process of recovering crude oil from a subterranean hydrocarbon containing formation as described in claim 1 where the one or more injection wells also serve as the one or more producing wells.

7. The process of recovering crude oil from a subterranean hydrocarbon containing formation as described in claim 1 where the one or more injection wells are different wells than the one or more producing wells.

* * * * *